United States Patent [19]

Roche

[11] Patent Number: 4,852,716
[45] Date of Patent: Aug. 1, 1989

[54] APPARATUS FOR SEPARATING LOGS

[76] Inventor: James B. Roche, 6828 S.R. 92, Lake Stevens, Wash. 98258

[21] Appl. No.: 773,354

[22] Filed: Sep. 5, 1985

Related U.S. Application Data

[63] Continuation of Ser. No. 303,951, Sep. 21, 1981, abandoned.

[51] Int. Cl.⁴ .............................................. B65G 47/26
[52] U.S. Cl. .................................. 198/443; 198/463.5; 414/745.9
[58] Field of Search ................ 414/748, 330; 198/443, 198/474, 723, 509, 580, 463.5

[56] References Cited

U.S. PATENT DOCUMENTS 3,214,001 10/1965 Callaghan ........................ 414/748 X
4,094,400 6/1978 Braun et al. ...................... 198/580 X

FOREIGN PATENT DOCUMENTS 2937496 3/1980 Fed. Rep. of Germany ...... 198/443

Primary Examiner—Robert J. Spar
Assistant Examiner—James R. Bidwell
Attorney, Agent, or Firm—Seed and Berry

[57] ABSTRACT

To feed logs singly to a debarker, for example, an apparatus for separating logs from a bundle includes an input conveyor to receive a bundle of logs and to convey them to a revolving drum. The drum has a plurality of fixed, rigid flights projecting outwardly from the periphery of the drum. As the drum revolves, the flights catch a single log and convey it to a conveyor for receiving each log as it leaves the drum. Thereafter, the single log or a single layer of logs is conveyed to a stop and loader which loads logs individually to the debarker conveyor in this example. This apparatus obviates the need to untangle logs by hand when they either clog a stop and loader, a debarker, or other log processing equipment. Nearly 100% efficiency is obtained with the apparatus of this invention, thereby greatly automating log processing.

12 Claims, 2 Drawing Sheets

APPARATUS FOR SEPARATING LOGS

This application is a continuation of U.S. patent application Ser. No. 303,951 filed Sept. 21, 1981, now abandoned under C.F.R. §1.62.

TECHNICAL FIELD

The present invention relates to an apparatus for separating logs. More particularly, this invention relates to a revolving drum having a plurality of fixed, rigid flights projecting outwardly from the periphery of the drum. The revolving drum encounters a bundle of logs and, preferably, separates a single log from the bundle to convey it singly to further processing. Specially prepared flights ensure efficient performance.

BACKGROUND ART

Characteristically, bundles of logs are placed on a series of conveyor chains running in substantially parallel lines. The bundle is conveyed along the chains to a stop and loader, for example, which, theoretically feeds individual logs to a debarker. However, the large bundle of logs often makes it difficult for the loader to function properly. Sometimes the loader is unable to tip a log or it tips more than one log at a time onto the debarker conveyor. Therefore, there is particular need for a system which will ensure entry of a single log into the stop and loader so that a single log likewise may be reliably entered into the debarker. Debarking is not the only operation where isolating a single log from a bundle is important; in fact, in most log processing, separation and isolation of each log or separation, into a single layer is necessary. The applicant is unaware of any patents covering apparatus to isolate logs or to transform a bundle of logs into a single layer; however, the applicant is aware of the following five patents for sorting timber and lumber:

| Inventor | U.S. Pat. No. |
|---|---|
| Coats | 3,822,778 |
| Lawson | 3,162,292 |
| Rysti | 3,581,891 |
| Romick et al. | 3,700,120 |
| Rysti | 4,205,751 |

Chain unscramblers are often used to form single layers of logs in commercial lumber mills today.

U.S. Pat. No. 3,724,648 discloses a bar feeder apparatus for separating one bar at a time from the supply of bars for processing with automatic screw machines, turret lathes, and centerless grinders. The stock metal bars used in this apparatus have a uniform diameter, while logs taper considerably. Furthermore, the patented apparatus is not designed to handle the extremely heavy loads encountered in separating logs. In fact, the movable disks would be inoperable in the case of log separation due to the weight of the logs.

U.S. Pat. No. 3,545,589 discloses a machine for gathering or accumulating cylindrical objects. Particularly, the objects envisioned are sticks used in making hard candy or other confections.

U.S. Pat. No. 3,135,422 discloses an article dispensing device especially suited for beverage cartons. Open-ended rectangular boxes are arranged around a revolving circular drum. Periodically, each box is accessible through a door in a sidewall of the dispenser Open-ended boxes of this sort would be inoperable in attempting to sort a single log from a bundle of logs on a conveyor chain. To use the boxes, logs would first have to be separated by hand. Therefore, the device of U.S. Pat. No. 3,135,422 would not accomplish the objective of this invention.

DISCLOSURE OF INVENTION

An automatic apparatus for separating logs from a bundle, either to isolate each log or to form a single layer of logs, is valuable in log processing wherein, for example, the apparatus feeds logs singly to a debarker. An input conveying means, such as a plurality of parallel, spaced conveyor chains, receives a 100,000- to 150,000-pound bundle of logs at a processing plant. The logs are conveyed to a collecting ramp where a drum revolves to separate a single log from the bundle and to convey it to suitable conveying means which feed each log to a stop and loader for processing equipment, such as a debarker. The revolving drum has a plurality of fixed, rigid flights projecting outwardly from the periphery of the drum in longitudinal dispostion parallel to the longitudinal axis of the drum. The flights form a cradle between a pitched surface of the flight and the periphery of the drum in which a single log may be conveyed. Preferably, the flight is pitched at an angle of about 78° with respect to the tangent of the drum at the point of contact between the pitched surface and the periphery of the drum. This angle provides a suitable cradle for most operations in separating logs. A steeply sloping support surface for the flight helps to ensure that only one log is placed in each cradle.

On certain bundles of logs, particularly of small diameter, the drum may convey multiple logs in each cradle. Still, the drum will ensure formation of a single layer of logs usually suitable for further processing at the plant.

A ramp before the drum is preferably pitched downwardly to act as a catch for logs being conveyed to the drum. Preferably, the angle of pitch is about 25°. When pitched at this angle, the logs will tend to fall towards the drum, while the design of the preferred flight of this invention will ensure that almost always only a single log is caught in the cradle. The other logs will be bounced back to remain a part of the bundle of logs which remain in the catch. Experience has shown that proper construction of the flight ensures more efficient isolation and separation of logs. Conventional means may be added to ensure transport of a single log in each cradle; a log kicker is preferred.

The drum for unscrambling logs weighs approximately 55,000 pounds to allow it to operate for logs up to 70 feet in length. The butt end of the logs is often much greater in diameter than the top end. Therefore, the bundle of logs in the catch is a jumble for the drum to unscramble. Also, different diameter logs may be a part of the bundle. The entire drum is preferably made from heavy gauge steel. As a center for the drum, a schedule 80 pipe forms a drive shaft. Welded to the drum are reinforced end walls to support a plate metal cylindrical sheath, which forms the outer periphery of the drum. Flights having the preferred pitch are welded to the sheath. Preferably, eight flights are spaced around the periphery of the drum, the drum having a diameter of approximately 8–10 feet for most conventional operations involving logs between about 4–32 inches in diameter.

While the drum may be an individual cylinder, more commonly, it will be necessary to prepare the drum in segments. Segments are desirable because logs for processing come in many different lengths. Also, the great weight of the apparatus of this invention requires use of support and thrust bearings along the length of the drum. Finally, most log processing operations already employ a plurality of spaced, parallel conveyor chains. Therefore, it is important that the drum be adaptable for placement in existing plants. When using a segmented drum, it is important that the flights on corresponding segments be essentially colinear with one another. Otherwise, the flights will tend to malfunction, and either no logs will be conveyed from the catch or multiple logs will be conveyed. In some circumstances, multiple logs will tend to jam the stop and loader or to disrupt the other processing operations, such as log scanning. If a loader or other equipment jams, men must separate the logs by hand. Labor in the logging industry is expensive, and the high costs of lumber today make it essential to provide an essentially automatic means for separating logs in debarking and other logging processes. The apparatus of this invention is one means for reducing the variable costs of the lumber business.

BRIEF DESCRIPTION OF THE DRWINS

BEST MODE FOR CARRYING OUT THE INVENTION

Figure 1:
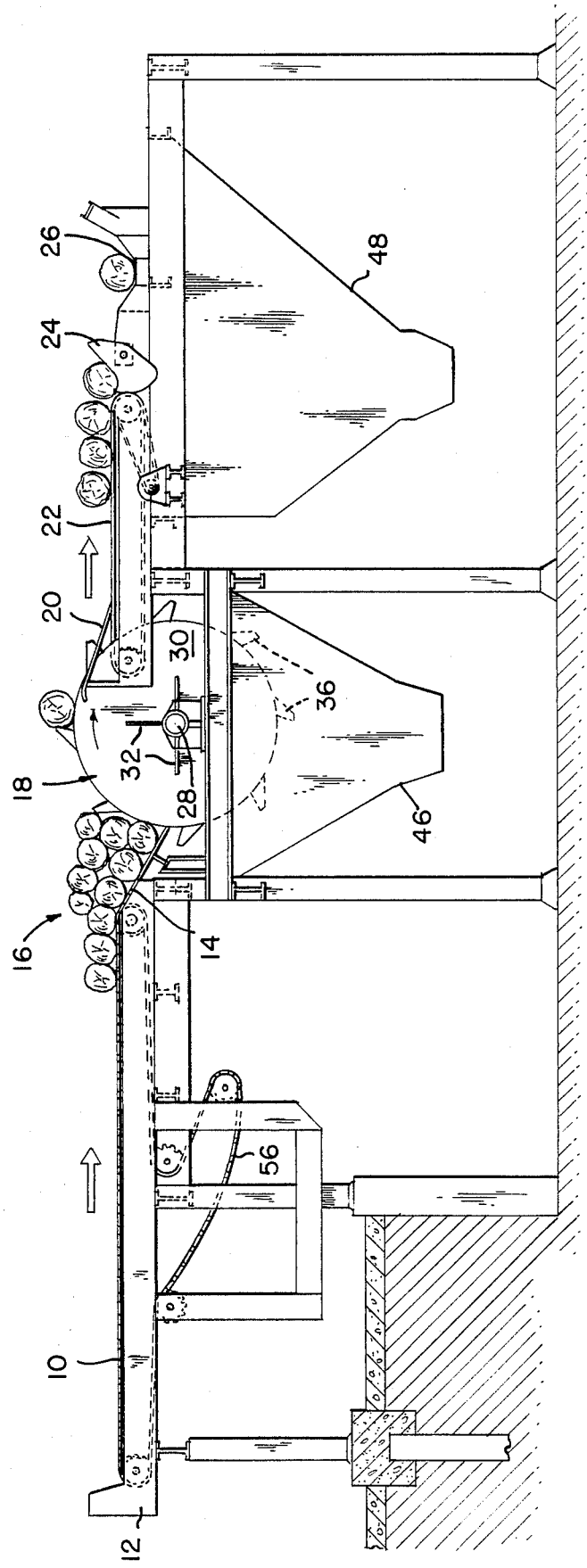
FIG. 1 is a partially schematic side elevation of an apparatus for separating logs according to this invention.
Figure 2:
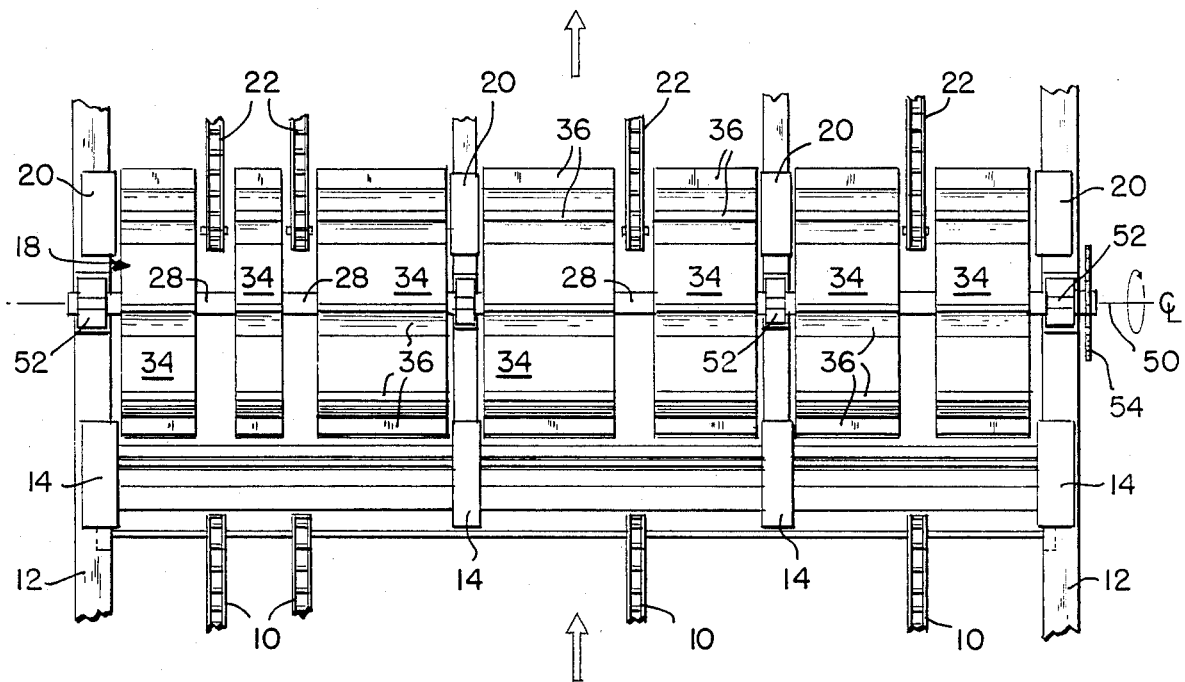
FIG. 2 is a partially schematic, partially sectional view of a preferred drum of this invention.
Figure 3:
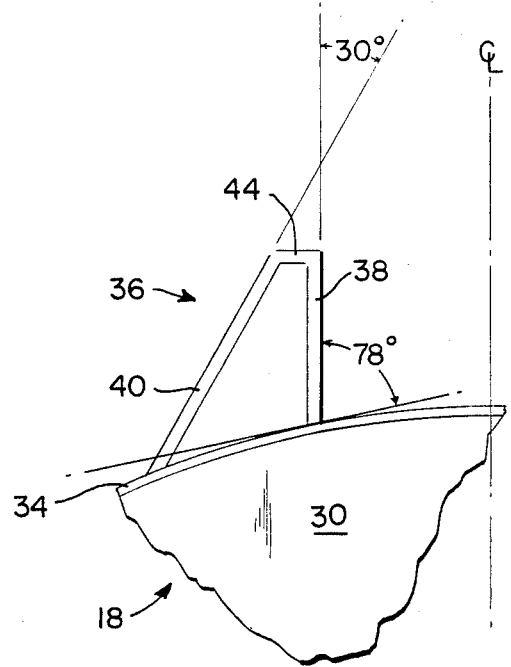
FIG. 3 is a partially sectional detail of a preferred flight on a drum of this invention.

As shown in FIGS. 1 and 2 for a debarking operation, a plurality of conveyor chains 10 above a deck 12 receive a bundle of logs at a processing plant. The chains 10 are driven to convey the bundle of logs to a ramp 14 which is pitched downwardly at approximately 25° from the horizontal. The ramp 14 forms a catch for the bundle of logs 16 between the conveying means 10 and a drum 18. The revolving drum will unscramble the logs and will convey them singly down a ramp 20 to a second conveying means 22 which transports the logs in a single layer to a stop and loader 24 positioned next to a debarker conveyor 26.

The drum has a central drive shaft 28 made from schedule 80 pipe. Welded to the drive shaft 28 are a plurality of reinforced circular disks which form end walls 30 of segments of the drum. Reinforcing ribs 32 are welded to the end walls 30 to provide additional strength for the end walls. A cylindrical sheath of heavy gauge plate metal forms the outer periphery 34 of the drum and is welded to the end walls 30. A plurality of spaced flights 36 are welded to the outer periphery 34 of the drum 18. For sorting logs of diameters between about 4-32 inches, each flight 36 has a pitched support surface 38 angled at approximately 78° to a tangent of the drum through the point of contact between the pitched surface 38 and the periphery of the drum. The pitched surface 38 is supported by a support 40 angled at approximately 30° to the pitched surface 38. A flight 36 of this construction provides a suitable cradle for holding a log. A butt end 44 on the flight strengthens the flight. The drum 18 preferably is disposed over a log deck cleanup bin and conveyor 46 so that debris and dirt jostled from the bundle of logs during unscrambling are easily collected. Similarly, it is preferred that a log deck cleanup bin and conveyor 48 be disposed under the stop and loader 24, the debarker conveyor 26, and other processing equipment.

The drum 18 is disposed substantially perpendicular to the direction of travel of the input conveying means 10. Because the drum 18 may be as long as 70-75 feet and weight as much as 55,000 pounds, it is important that the drum 18 be well supported. Therefore, it is common that the drum 18 will be made of a plurality of segments, as shown in FIG. 2. Between the segments, thrust bearings 52 may be used to reduce rotational friction of the drive shaft 28 and to provide support for the drum 18. When segmented, support means (not shown) may be used between the segments of the drum 18 to insure that the logs lie substantially parallel to the longitudinal axis of the drum 18. Suitable input power means (not shown) are used to revolve the drum 18 so that unscrambling of the bundle of logs may be accomplished. A sprocket 54 may be placed on one end of the drum to allow input angular momentum to the drum 18.

Log unscrambling, prresently, is not done efficiently with chain unscramblers because of the large cost of maintenance for the chains. Often the chains become skewed from one another, and logs ae not conveyed away from the cradle. Also, the chains are not sufficiently durable so they must be replaced often. A rigid, durable drum reduces fixed and variable costs in log processing. Without a chain unscrambler, bundles of logs 16 are placed on input conveying means 10 which directly convey the logs to the stop and loader 24. This direct conveyance is best understood by reference to FIG. 1, where the lower loop of chain 56 is used to take up slack in the chains caused by insertion of a drum 18 into a conventional log debarking process. When a bundle of logs 16 is placed on the deck 12 and conveyed directly to the stop and loader 24, the logs (weighing up to about 100,000 pounds/bundle) often jam the loader. The stop and loader 24 operates by pivoting to move one log onto the debarker conveyor 26. However, with a large bundle of logs in scrambled condition, due to the variance in diameter along the length of the logs, the stop and loader often misfunctions or malfunctions. That is, either the great weight of the bundle keeps the stop and loader 24 from pivoting or the stop and loader 24 feeds multiple logs to the debarker conveyor 26. Multiple logs tend to jam the conveyor 26 and require removal of the extra logs by hand. Removal operations subject workmen to dangerous conditions as well as requiring brief shutdown of the debarking process. Both of these problems lead to increased costs for the lumber industry.

The drum unscrambler according to this invention provides a quick and efficient means for ensuring that the stop and loader 24 receives only one log at a time. Rigidly constructed, the drum 18 (which forms the crux of the separating apparatus of this invention) is relatively inexpensive and automates an otherwise frustrating and expensive operation. The pitched flights provide an adequate cradle for most logs encountered in processing today and are designed to convey only one log at a time. For example, for a 4-foot radius drum, a preferred flight has a pitched surface having a length approximately 9⅛-inch long. With a 2-inch butt segment 44, the support 40 is approximately 12⅝ inches long on this drum. Such a flight is particularly useful in the processing of smaller diameter logs, which are more commonly being cut today. This type of flight is designed preferably to contact a single log in the catch formed by the ramp 14 and to move that log upwardly while allowing other logs in the bundle to fall down in the catch along the angled support 40. Other designs for the flight have not proven as successful.

Sometimes a flight will catch multiple logs in its cradle. When transporting the logs to a plurality of conveyor chains (as shown in the figures), conveying multiple logs often is not a problem. A single layer of logs will be formed for entry into the stop and loader 24. However, in log scanning, for example, it is important to isolate logs with the drum 18 so that proper scanning is completed without delay. Conventional means, such as a log kicker, now used on chain unscramblers, may be incorporated into the design to ensure that, at most, only one log is conveyed by each flight. The isolated logs, then, will be maintained as isolated logs throughout further processing by such means as a lugged conveyor chain.

While discussion has focused on separating logs for a debarking operation, the drum unscrambler of this invention may be used in most log processing opeations where isolation of a single log or formation of a single layer of logs is necessary. In particular, this invention is especially suited for long scanning operations prior to cutting.

I claim:

1. An apparatus for separating logs from a bundle and for feeding the logs singly to a debarker, comprising:
   (a) an input conveying means to receive a bundle of logs;
   (b) a revolving drum having a solid cylindrical periphery and a plurality of fixed, rigid flights having a pitched surface projecting outwardly from the periphery of the drum at an acute angle, wherein the longitudinal axis of the drum is disposed substantially perpendicular to the direction of movement of the input conveying means and wherein each flight is capable of conveying logs from the input conveying means as the drum revolves;
   (c) a downwardly pitched collection ramp between the input conveying means and the drum to serve as a catch for incoming bundles of logs wherein the downward pitch is sufficient to position the end of the ramp substantially in a horizontal plane containing the axis of the drum;
   (d) means for receiving each log as each log leaves the drum;
   (e) means for conveying each log away from the drum and means for receiving each log to ensure a single layer of logs, each log being properly disposed for entry to a debarker conveyor; and
   (f) stop and loader means to load each log of the single layer, in turn, to a debarker conveyor.

2. The apparatus of claim 1 wherein the ramp is pitched downwardly from the horizontal at no greater than about 25°.

3. The apparatus of claim 1 wherein the acute angle of the pitched flights is about 78° with respect to the tangent of the drum at the flight's pitched surface.

4. The apparatus of claim 1 wherein the drum is disposed above a log deck cleanup conveyor.

5. The apparatus of claim 1 wherein the input conveying means includes a chain conveyor means to transport bundles of logs to the drums.

6. The apparatus of claim 1 wherein the drum includes a central drive shaft, a plurality of cylindrical segments having end walls extending outwardly from the shaft, flights on each segment so that the corresponding flights on each segment are colinear, and a plurality of thrust bearings between segments on the drive shaft to reduce rotational friction.

7. The apparatus of claim 6 wherein the drum further includes reinforcing ribs for each segment to strengthen the end walls.

8. An apparatus for singulating a bundle of logs, comprising:
   a horizontal input conveyor for receiving a bundle of logs;
   a revolving drum having a solid, cylindrical periphery and pitched flights projecting outwardly from the drum periphery at an acute angle, wherein the axis of the drum is positioned relative to the conveyor so that the periphery of the drum is spaced away from the conveyor; and
   a substantially planar downwardly pitched collection ramp in the space between the drum periphery and the horizontal input conveyor wherein one end of the ramp abuts the horizonal input conveyor to receive logs therefrom and wherein the other end of the collection ramp is substantially positioned in a horizontal plane containing the drum axis so that the ramp and the drum periphery form a pocket for the logs.

9. The apparatus of claim 8 wherein the ramp is pitched downwardly from the horizontal at approximately 25°.

10. The apparatus of claim 8 wherein the drum has a radius of approximately four feet and wherein the flights are pitched at an angle of approximately 78° with respect to a tangent to the drum periphery.

11. The apparatus of claim 10 wherein the flights have a forwardly facing surface pitched at the 78° angle and a rearwardly facing backside at an angle of 30° with respect to the forwardly facing surface so that logs rejected by the flight will roll off the backside back into the log pocket.

12. The apparatus of claim 11 wherein the forwardly facing surface has a length of approximately $9\frac{1}{8}$ inches and wherein the backside has a length of approximately $12\frac{5}{8}$ inches and wherein the ends of the backside and forwardly facing surface opposite the drum periphery are joined by a butt segment having a length of approximately 2 inches.

* * * * *